United States Patent [19]

Yang

[11] Patent Number: 5,169,670

[45] Date of Patent: * Dec. 8, 1992

[54] LOW SATURATE FRYING OIL WITH FRIED FLAVOR

[75] Inventor: David K. Yang, Cincinnati, Ohio

[73] Assignee: The Procter & Gamble Company, Cincinnati, Ohio

[*] Notice: The portion of the term of this patent subsequent to Apr. 14, 2009 has been disclaimed.

[21] Appl. No.: 803,845

[22] Filed: Dec. 9, 1991

Related U.S. Application Data

[63] Continuation of Ser. No. 645,427, Jan. 24, 1991, Pat. No. 5,104,678, which is a continuation-in-part of Ser. No. 527,510, May 23, 1990, abandoned.

[51] Int. Cl.$^5$ .................... A23D 9/00; A23L 1/231; C11B 7/00
[52] U.S. Cl. .................................. 426/607; 426/417; 426/533; 426/534; 426/601; 426/613
[58] Field of Search ............... 426/601, 417, 533, 534, 426/607, 613

[56] References Cited

U.S. PATENT DOCUMENTS 5,104,678  4/1992  Yang .................................. 426/601

FOREIGN PATENT DOCUMENTS 75007606 10/1966 Japan .
52-062313 11/1975 Japan .

OTHER PUBLICATIONS

Swern, et al, "Trans-Octadecenoic Acid Content of Beef Fat. Isolation of Elaidic Acid from Oleo Oil", J. Am. Oil Chem. Soc., pp. 44-46 (1952).
Swern, et al, "Fractionation of Tallow Fatty Acids", Oil and Soap (1945).
Markley, "Fatty Acids, Their Chemistry, Properties, Production, and Uses", 2088-2090, 2120, Interscience Publishers (1964).
Gunstone, et al "Lipids in Foods, Chemistry, Biochemistry and Technology", Pergamon Press, pp. 85-91 (1983).
Sinram, et al, "Flavored Vegetable Oils as a Substitute for Beef Tallow in Deep-Frying Applications", Food Technology, pp. 90-94 (1989).
Bailey's Industrial Fats & Oils, vol. 1, 4th Ed., Formo et al. Wiley-Interscience, (1979) p. 101.
Reinschneider, et al., Oil and Soap, 23, 276-83 (1946).

Primary Examiner—Joseph Golian
Assistant Examiner—Evan Federman
Attorney, Agent, or Firm—Jerry J. Yetter; Rose Ann Dabek

[57] ABSTRACT

An unsaturated or low saturated frying oil which imparts the beefy or tallow flavor to foods that is characteristic of animal fats is disclosed. This oil is made by a process of esterifying glycerine with the unsaturated fraction of animal fat and then deodorizing or refining the resultant triglyceride. The unsaturated fraction of the animal fat contains minor fatty acids which produce this flavor on heating. Usually less than 5 mg of cholesterol/100 gm is in the oil.

14 Claims, 3 Drawing Sheets

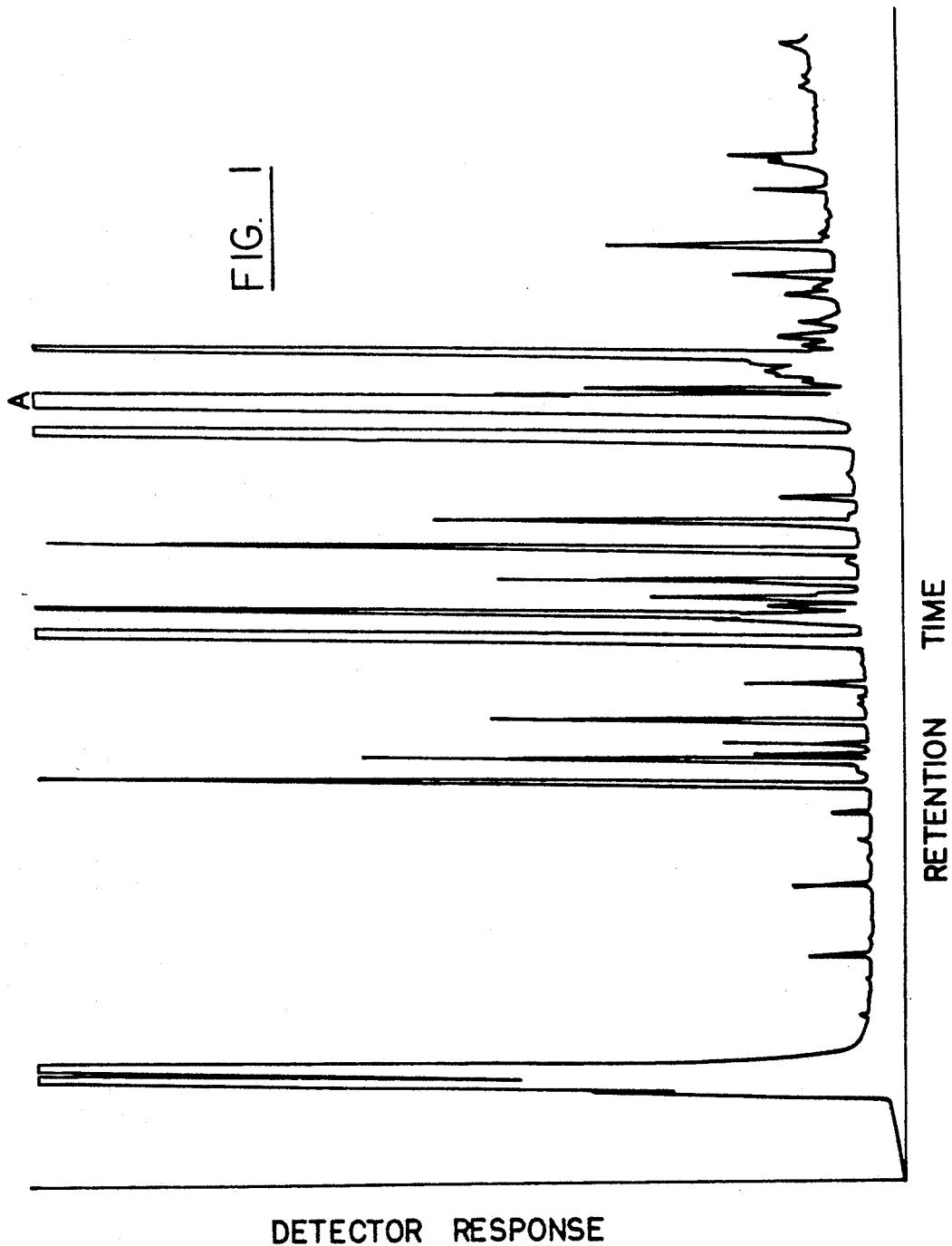

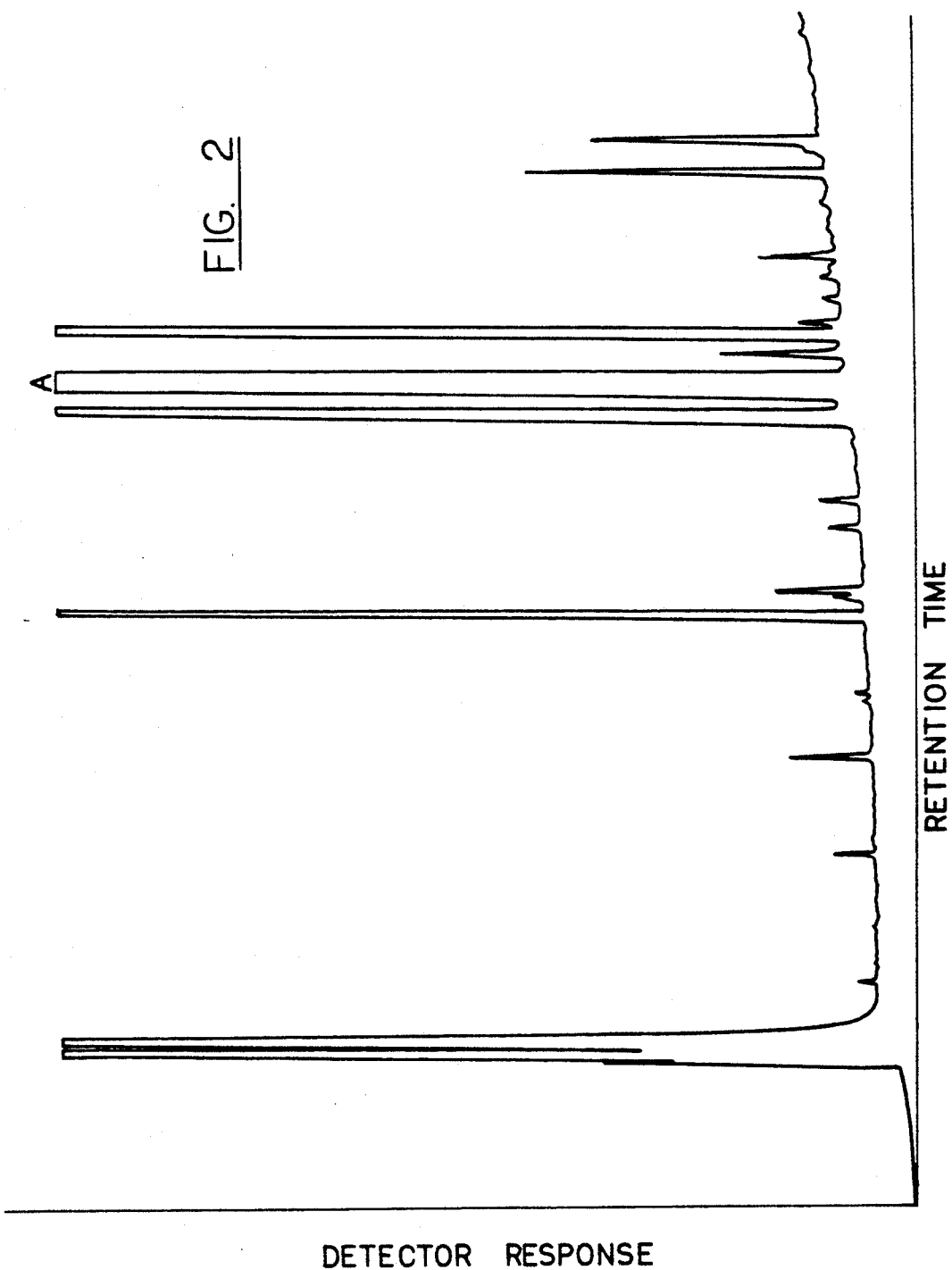

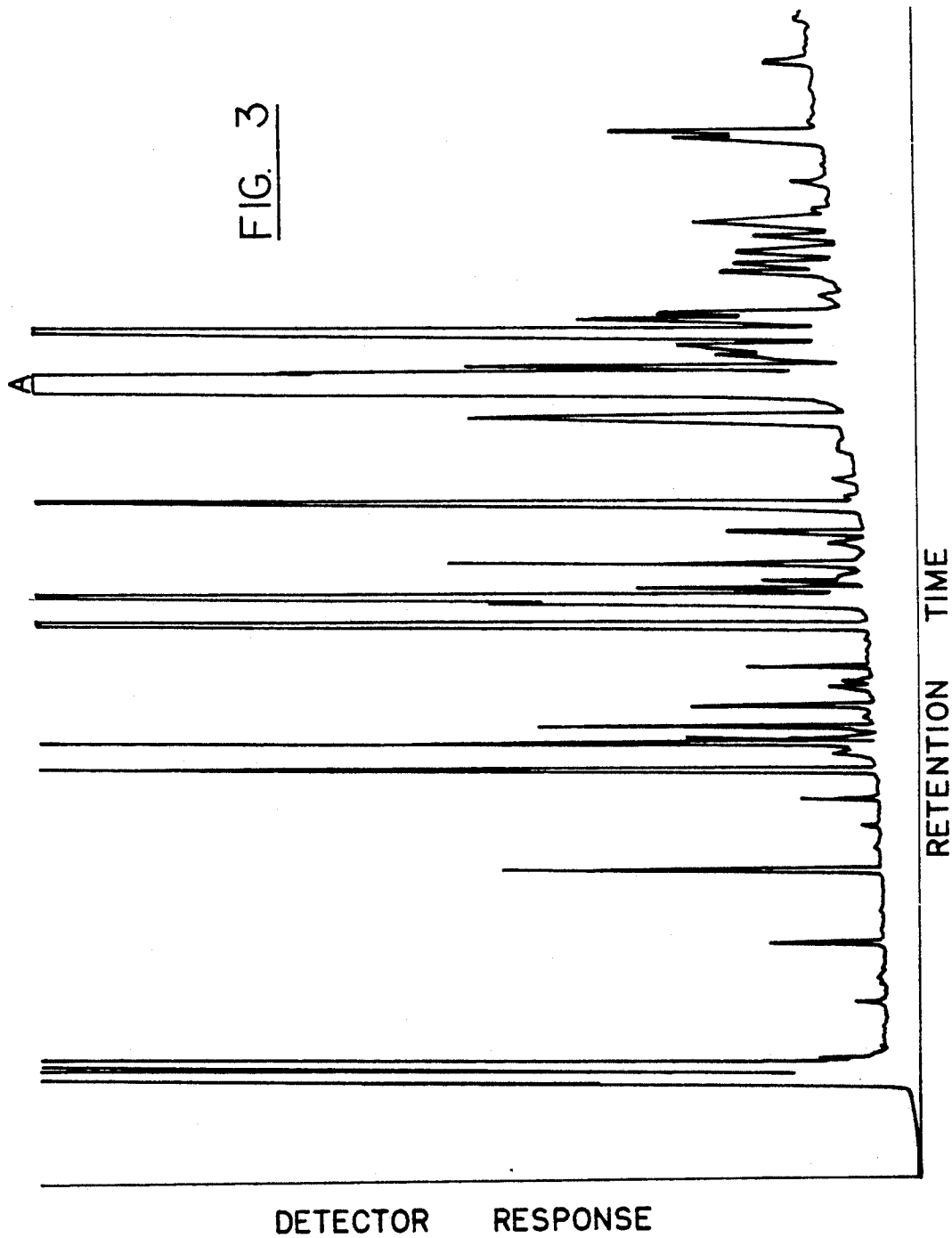

LOW SATURATE FRYING OIL WITH FRIED FLAVOR

This is a continuation of application Ser. No. 07/645,427, filed on Jan. 24, 1991, now U.S. Pat. No. 5,104,678 which is a continuation-in-part of copending application, Ser. No. 07/527,510, filed May 23, 1990, now abandoned.

TECHNICAL FIELD

This invention is a low saturated frying fat or oil that delivers the fried flavors associated with saturated animal fats. The frying oil contains a flavor composition of triglycerides which produces a tallow or animal fat flavor and which has very little or no cholesterol.

BACKGROUND OF THE INVENTION

Fats and oils are triacylglycerides, or triglycerides formed by an esterification reaction of fatty acids with glycerol, a trihydroxy alcohol. The distinction between a fat and an oil is arbitrary. At room temperature a fat is solid and an oil is liquid. Most triacylglycerides found in animals are fats, while those in plants tend to be oils.

Fats and oils, the most commonly occurring lipids, are a major source of dietary energy. They contribute about twice as much energy per weight as carbohydrates or proteins.

Metabolically, ingested fats and oils are hydrolyzed into monoacylglycerides, diacylglycerides, fatty acids, and glycerol, all of which can be absorbed through the intestinal wall. The body then (1) utilizes these hydrolyzed or partially hydrolyzed fats as raw materials to synthesize its own fats, (2) converts the fatty acids to other compounds such as carbohydrates or cholesterol esters; or (3) converts the fatty acids to energy. The effects of dietary fats on cholesterol metabolism is of particular interest due to reports which link high levels of cholesterol in the blood (hypercholesterolemia) with arterial disease.

Low fat diets have long been known to be an effective means for lowering the serum-cholesterol level in humans, and, thereby lowering the risk of hypercholesterolemia (see Keys et al., *Science,* 112, 79 (1950); Melinkoff et al., *Am. J. Med Sci.,* 220, 203 (1950); Groen et al., *Voeding,* 13, 556 (1952); Keys, *Circulation,* 5,115 (1952); Keys et al., *Clin. Chem.,* 1,34 (1955).

In 1957, Keys, Anderson and Grande, *The Lancet,* 2, 959–66, (1957) demonstrated that human serum-cholesterol levels were influenced by the quality of the fats rather than the quantity. It was demonstrated that the intake of saturated fatty acids containing 12 or more carbon atoms produced increased serum cholesterol levels in humans. Unsaturated fatty acids were found to lower serum cholesterol levels.

Grande, Anderson and Keys, *Am. J. Clin. Nut.,* 23 (9), 1184–1193 (1970), disclosed that serum cholesterol and serum phospholipids levels are higher in men having diets rich in palmitic acid ($C_{16:0}$) when compared to men having diets rich in stearic acid ($C_{18:0}$).

Oils rich in oleic acid are known. For example olive oil is predominently triolein. U.S. Pat. No. 4,460,614—Stratmann, et al. (1984) describes a process for interesterifying tallow and olein. The product is high in unsaturated and polyunsaturated triglycerides.

U.S. Pat. No. 3,900,503—McNaught (1975) discloses fats made by randomly interesterifying sunflower and tobacco seed oils. The products are described as being polyunsaturated oils. Tobacco seed oil and some sunflower seed oil are high in oleic acids. Most sunflower oils are high in linoleic acid.

Swern et al., "Fractionation of Tallow Fatty Acids". The preparation of purified oleic acid and an inedible olive oil substitute, *Oil and Soap,* (November, 1945) describes the fractionation of tallow into a saturated fraction and an oleic acid fraction. The oleic acid fraction contains 85.7% oleic acid, 4.4% polyunsaturated acids, and 9.9% saturated acids. This fraction can be further purified to yield a 98% oleic acid, 2% saturated fatty acid fraction. The oleic acid is then used to esterify glycerine to make an olein (trioleyl triglyceride).

Vegetable oils are low in cholesterol and high in unsaturated fatty acids both of which are desirable. Yet vegetable oils do not give fried foods a meaty, beefy or tallow flavor which is associated with animal fats, e.g. tallow. The exact identification of what produces this meaty, beefy or tallow flavor has not yet been accomplished. It has recently been discovered that the oleic acid fraction or the unsaturated fatty acid cut of tallow, lard or other animal fats rich in oleic acid can be esterified with glycerine to produce a triglyceride mixture which imparts a tallow or cooked meat flavor to the fried foods and has little or no cholesterol. It is believed that the presence of the $C_{12}$ to $C_{24}$ mono-unsaturated fatty acids, methyl-branched chain isomers of fatty acids having from 12 to 24 carbons, hydroxy fatty acids, odd chain acids, and polyunsaturated fatty acids contribute to the production of the fried beef or animal flavor during use. These are not necessarily all of the materials which contribute to this flavor.

Therefore, it is an object of this invention to produce a triglyceride which is at least 85% unsaturated, and which contains some mixed esters of fatty acids, including mono and poly-unsaturated, methyl-branched chain, odd chain, hydroxy fatty acids and other unidentified minor fatty acids typically present in tallow.

This composition imparts a beefy or tallow flavor to foods fried in this synthetic triglyceride without adding cholesterol to the foods.

These and other objects of the invention will be evident from the description herein.

All percentages are by weight unless otherwise indicated.

DESCRIPTION OF THE FIGURES

FIGS. 1, 2 and 3 are gas chromatograms of tallow, a high oleic acid sunflower oil and a representative triglyceride of the present invention respectively. As is evident, the tallow and tallow derived triglyceride have many more fatty acids present in minor amounts than does the sunflower oil. These are the materials which are responsible for the development of the tallow or meaty flavor.

SUMMARY OF THE INVENTION

Described herein is a frying oil capable of imparting an animal or tallow flavor to foods fried therein, the frying oil comprising:
  a) 15% or less saturated fatty acids specifically ($C_{12:0}$, $C_{14:0}$, $C_{16:0}$ and $C_{18:0}$).
  b) 5% to 80% oleic acid.
  c) the balance made up of a mixture of the typical minor fatty acids contained in tallow, lard or animal fats including a) $C_{12}$ to $C_{24}$ unsaturated fatty acids which include the odd chain unsaturated acids, b) methyl-branched chain isomers of the unsaturated and saturated fatty acids from 12 to 24 carbons, c) hydroxy fatty acids, d) odd chain saturated fatty acids and e) polyunsaturated fatty acids such as linoleic, linolenic and arachodonic acid. This oil contains less than 10 mg cholesterol per 100 gms and usually less than 5 mg cholesterol/100 gm.

A process for making a low saturated frying oil comprising:
a) fractionating fatty acids from animal fats to an unsaturated fraction and a saturated fraction;
b) esterifying glycerine with the unsaturated fraction; and
c) deodorizing and bleaching the resultant triglyceride is also disclosed herein.

DETAILED DISCLOSURE OF THE INVENTION

As used herein the term "olein" refers to a triglyceride of oleic acid.

As used herein the term "minor fatty acids" refers to the fatty acid substituents of tallow or lard which are present in minor amounts; generally less than 15%. These fatty acids include straight chain fatty acids which are unsaturated and saturated, including both odd and even numbered chains, e.g., $C_{14:0}$, $C_{15:0}$, $C_{16:0}$, $C_{17:0}$ and $C_{18:0}$. It also includes unsaturated fatty acids wherein the unsaturation is one or more double bonds in an unspecified position in these same fatty acids (e.g. $C_{18:1}$, $C_{18:2}$). The methyl branch chain saturated fatty acids as well as the hydroxy substituted derivatives of these fatty acids are also included. Minor fatty acid components do not include cholesterol, or if cholesterol is present it is present at less than five (5) milligram per 100 grams. Other naturally occuring fatty acids are also present in this minor fraction, which have not been isolated, even though they have been identified in the literature.

As used herein, the term "methyl branched chain substituted fatty acid" refers to a fatty acid containing one methyl group as, for example, 13-methyl tetradecanoic acid or 12-methyl tetradecanoic acid. The methyl of the branched chain fatty acids are usually on the second or third carbons of the chain (the tail). These are called iso and anteiso isomers. For example, 12-methyltridecanoic acid is isotetradecanoic acid and 11-methyltridecanoic acid is anteiostetradecanoic acid.

As used herein, the "hydroxy substituted" or "hydroxy" fatty acid refers to a fatty acid having one or two hydroxy substituents. An example of a hydroxy fatty acid would be 2-hydroxy stearic acid.

As used herein, the term "tallow flavor" or "beefy flavor" or "meaty flavor" refers to the positive flavor which is generated in the fats of this invention. It is reminiscent of foods fried in tallow (beef fat) or lard (pork fat).

As used herein, the term "polyunsaturated fatty acid" refers to fatty acids having more than one unsaturated position or double bond. Examples of polyunsaturated fatty acids are linoleic ($C_{18:2}$), linolenic ($C_{18:3}$) and arachidonic ($C_{20:4}$).

While not wishing to be bound by theory, it is believed that the oleic acid forms oxidation products which contribute to this flavor, i.e. hexanals, octanals, and various ketones. Moreover, the minor fatty acids also released due to hydrolysis can oxidize to form positive flavor notes. Particularly important contributors to this flavor are the low levels of other monounsaturated and polyunsaturated acid oxidation products.

As used herein the term "comprising" means that other substituents which do not change the benefit of the invention may be present in the composition, as for example anti-oxidants, coloring agents, and other positive flavor notes. This term encompasses the more narrow terms "consisting of" and "consisting essentially of."

As used herein, the term "unsaturated fraction" or "oleic acid fraction" refer to the fraction of the fatty acids, their esters or of the triglycerides of tallow which are predominantly unsaturated fatty acids. This fraction contains high levels of oleic acid.

FATTY ACID CONSTITUENTS

The primary fatty acids of tallow and most animal fats are stearic acid, palmitic acid and oleic acid. Tallow and lard contain both a saturated and an unsaturated fraction. The separation of these two fractions can be accomplished by crystallization of the triglycerides wherein the stearic acid and palmitic fraction is separated from the oleic acid fraction. The fat can also be converted to glycerine and methyl fatty acid esters by an intraesterification process with methanol. The methyl esters are then fractionated. The unsaturated fraction is rich in oleic acid and also contains key minor fatty acids. Purification of this fraction containing oleic acid or its esters by crystallization or distillation produces an oleic acid fraction which contains certain minor components.

The unsaturated fatty acid fraction of tallow or animal fats can be made by any conventional means. This includes hydrolysis in the presence of acids, saponification using alkali metal alkoxides or alkali metal hydroxides such as potassium methoxide or sodium hydroxide, or by enzymatic hydrolysis. The fatty acids isolated can be fractionated by crystallization or distillation. The fatty acids can also be converted into lower alkyl which are usually easier to separate.

These minor fatty acids which represent about 10% to 20% of the fatty acids present in tallow or animal fat contribute significantly to the fried food flavor of foods cooked in animal fats. The presently identified fatty acids believed to contribute to this flavor are:

Dodecanoic acid ($C_{12:0}$), tetradecanoic acid ($C_{14:0}$), tetradecenoic acid ($C_{14:1}$), 12-methyltetradecanoic acid (a-$C_{15:0}$), 13-methyltetradecanoic acid (i-$C_{15:0}$), pentadecanoic acid ($C_{15:0}$), 14-methylpentadecanoic acid (i-$C_{16:0}$), hexadecanoic acid ($C_{16:0}$), hexadecenoic acid ($C_{16:1}$), heptadecanoic acid ($C_{17:0}$), heptadecenoic acid ($C_{17:1}$), octadecanoic acid ($C_{18:0}$), octadecenoic acid ($C_{18:1}$), octadecadienoic acid ($C_{18:2}$), and octadecatrienoic acid ($C_{18:3}$). While these acids have been identified, they are not a total list of the minor components which contribute to the overall flavor. They serve as indicators that the flavor components are present in the unsaturated or oleic acid fraction of tallow or animal fat.

The gas chromatograms profile these minor ingredients in the fatty acid composition from tallow (Frial ®), high oleic sunflower oil, and a representative triglyceride of this invention. The largest peak (A) in FIGS. 1, 2 and 3 is oleic acid. The point at which each component elutes depends on its volatility and polarity. Usually the lowest molecular weight materials elute first.

A tallow or animal fat flavor concentrate can be made by decreasing the oleic acid in the oleic acid fraction of tallow to about 10%. The minor fatty acids are then proportionately increased in concentration. The triglyceride made from this composition will be lower in oleic acid, but still retains the characteristic animal fat flavor when foods are cooked using it. This concentrate composition can be added to vegetable oils or other triglycerides to make an oil which provides the benefits of this invention. It will usually be added at levels of from about 1% to about 15% by weight of the oil.

PREPARATION OF THE GLYCERIDES

The oleic acid/minor fatty acid fraction of animal fat is esterified with glycerine. Any conventional esterification process can be used. For example, reaction of glycerine and the fatty acid mixture in an anhydrous system with or without an acid or base catalyst is acceptable. Acids which are suitable for this reaction include sulfuric acid or phosphoric acid. Bases which can be used to catalyze the reaction include the alkali metal hydroxides as for example, sodium hydroxide, potassium hydroxide and lithium hydroxide.

Transesterification of glycerine with the unsaturated fatty acid lower alkyl esters can also be used. In this case, the oleic acid or unsaturated fatty acid fraction of the fat is converted to methyl or ethyl esters and then reacted with glycerine. Optionally strong base esterification catalysts such as sodium hydroxide or sodium methoxide, or strong acid esterification catalysts such as hydrogen fluoride, perchloric acid, phosphoric acid or p-toluenesulfonic acid are used.

The esterification process is typically carried out in a solvent-free system. At the temperatures at which the esterification process is carried out, the mixture of glycerine and fatty acids forms an essentially homogeneous melt.

An important aspect of the esterification process is the removal of water generated during the reaction of the fatty acids with the glycerine. It has been found that water generated during this reaction that remains in the reaction mixture can cause hydrolysis of the resulting glycerides. Preferably, water generated during the reaction is continuously removed from the reaction mixture. Suitable methods for continuous removal of this generated water include vacuum stripping of the reaction mixture (e.g., at pressures of from 50 to 300 mm Hg), inert gas (e.g., nitrogen) sparging of the reaction mixture using high shear mixing with high gas velocities, adsorption by hydrophilic materials such as zeolite molecular sieves, activated carbon and activated alumina, or combinations of these techniques. For example, in the case of nitrogen gas sparging, 0.1 to 10 l./min. gas flow per liter of reaction mixture in conjunction with high shear mixing (e.g. a 5 to 600 m./min. tip speed) are preferred for removal of generated water. (This degree of high shear mixing is typically achieved by a drive motor energy input of 1.5 to 3 kilowatts per 1000 liters of reaction mixture.) In addition, it is preferred that the fatty acids and glycerine be essentially anhydrous (e.g. by vacuum dehydration) prior to esterification.

Subsequent purification can be carried out by a variety of techniques, or combinations of techniques. For example, unreacted fatty acids can be removed by precipitation as salts (e.g., by addition of a base such as potassium carbonate), by the use of reverse osmosis membranes (e.g., NIRO HR 98 polyamid/polysulfane thin film composite membranes) having a low (e.g., 200 molecular weight) cutoff, by flash evaporation, by steam stripping, or by vacuum distillation.

The reaction can be run without a catalyst at elevated temperatures, from about 100° C. to 250° C. Preferably, the reaction is run at between 175° C. and 200° C. The rate of reaction is increased if the water is removed during the reaction. This can be done by using a nitrogen sparge which will remove the water as vapor. Reacting the glycerine and the oleic acid fraction under an inert atmosphere as, for example, nitrogen or carbon dioxide, minimizes oxidation of the acids at the elevated reaction temperatures and also minimize oxidation of the resultant mono, di or triglyceride.

The molar ratio of fatty acid to glycerine is usually from about 3 to 1 to about 8 to 1. At the end of the reaction, the excess oleic acid and minor fatty acids are removed by using vacuum distillation, usually at from 175° C. to 260° C. at pressures of from about 1 mm Hg to about 25 mm Hg.

The resultant triglyceride can be decolorized and purified by a steam stripping reaction. Any conventional bleaching or deodorization process used to remove colors and off flavors from oils can be used. Generally, steam stripping at temperatures of from about 220° C. to about 270° C. under vacuum for sufficient time to remove the off flavors and colors is used. Batch steam stripping for about 3 hours at 260° C. at 1 to 5 mm Hg is useful. Any continuous deodorization process which utilizes thin films or spraying can be used.

The triglyceride formed by this reaction is dependent upon the fatty acid composition of the oleic acid derived from the fat. A typical composition has the following composition:

| Component | Percentage |
| --- | --- |
| Unsaponifiable | less than 0.2% |
| Free fatty acids | less than 0.05% |
| Cholesterol | less than 5 mg per 100 grams |
| Diglyceride | 0%–4% |
| C46 Triglyceride | 0 to 0.5% |
| C48 Triglyceride | 1.5%–2.5% |
| C50 Triglyceride | 8–12% |
| C52 Triglyceride | 15–25% |
| C54 Triglyceride | 45–70% |
| C56 Triglyceride | 1–2.5% |
| C58 Triglyceride | 0.1–.3% |
| C62 Triglyceride | 0–2% |
| Others | 0–15% |

The triglyceride composition is determined by a carbon number profile (see Analytical Methods section).

The C46 to C62 triglycerides are mixed triglycerides containing at least one or two oleic acid groups and one or two of the minor components.

The present highly unsaturated fats are useful in a wide variety of food and beverage products. The primary advantage of these oils is their use as deep frying oils that impart tallow or "beefy" flavors to french fries and other fried foods. For example, the fats can be used in the production of baked goods in any form, such as mixes, shelf-stable baked goods, and frozen baked goods. Possible applications where the lard or tallow flavor is desired include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong and Brabbs. The baked goods can contain fruit, cream, or other fillings. Other food uses include breads and rolls, crackers, pretzels, pancakes, waffles, ice cream cones and cups, yeast-raised baked goods, pizzas and pizza crusts, baked farinaceous snack foods, and other salted snacks.

In addition to their uses in baked goods, the highly unsaturated, tallow flavored fats can be used alone or in combination with other fats and oils to make shortening and oil products. Suitable sources of regular fats and oils include, but are not limited to: 1) vegetable fats and oils such as soybean, corn, sunflower, rapeseed, low erucic acid rapeseed, canola, cottonseed, olive, safflower, and sesame seed; 2) meat fats such as tallow or lard; 3) marine oils; 4) nut fats and oils such as coconut, palm, palm kernel, or peanut; 5) milkfat; 6) cocoa butter and cocoa butter substitutes such as shea, or illipe butter; and 7) synthetic fats. Shortening and oil products include, but are not limited to, shortenings, frying oils, margarines, spreads, butter blends, lards, salad oils, popcorn oils, salad dressings, mayonnaise, and other edible oils.

These highly unsaturated, tallow flavored fats can be mixed with low or zero calorie fats to make unsaturated reduced calorie compositions. Preferred mixtures comprise:

A. From about 10% to about 65% of an edible, substantially nonabsorbable, substantially nondigestible polyol fatty acid polyester having at least 4 fatty acid ester groups, wherein the polyol is selected from sugars and sugar alcohols containing from 4 to 8 hydroxy groups and wherein each fatty acid group has from 2 to 24 carbon atoms; and B. From about 35 to about 90% highly unsaturated, tallow flavored triglycerides.

Another reduced calorie composition comprises:

A. From about 10% to about 65% of a reduced calorie fat selected from MMM, MLM, MML, LLM, LML and LLL triglycerides, and mixtures thereof; wherein M is a saturated fatty acid residue selected from $C_6$ to $C_{10}$ saturated fatty acids, and mixtures thereof; wherein L is a saturated fatty acid residue selected from $C_{18}$ to $C_{24}$ saturated fatty acids, and mixtures thereof; preferably, at least about 85% is combined MLM, MML, LLM and LML; and up to about 15% combined MMM and LLL triglycerides, and the fatty acid composition comprises: (1) from about 10 to about 70% $C_6$ to $C_{10}$ saturated fatty acids; and (2) from about 30 to about 90% $C_{18}$ to $C_{24}$ saturated fatty acids; and B. From about 35% to about 90% of the unsaturated fat of this invention.

Bulking or bodying agents are useful in combination with the highly unsaturated, tallow or animal flavored fats in many food compositions. The bulking agents can be nondigestible carbohydrates, for example, polydextrose and cellulose or cellulose derivatives, such as carboxymethylcellulose, carboxyethylcellulose, hydroxypropylcellulose, methylcellulose and microcrystalline cellulose. Other suitable bulking agents include gums (hydrocolloids), starches, dextrins, fermented whey, tofu, maltodextrins, polyols, including sugar alcohols, e.g. sorbitol and mannitol, and carbohydrates, e.g. lactose.

Similarly, food and beverage compositions can be made that combine the present highly unsaturated, tallow flavored fats with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, apples, apricots, and watermelon rinds.

These dietary fibers may be in a crude or purified form. The dietary fiber used may be of a single type (e.g. cellulose), a composite dietary fiber (e.g. citrus albedo fiber containing cellulose and pectin), or some combination of fibers (e.g. cellulose and a gum). The fibers can be processed by methods known to the art.

The highly unsaturated, tallow or animal flavored fats can also contain minor amounts of optional flavorings, emulsifiers, anti-spattering agents, anti-sticking agents, anti-oxidants, or the like.

Foods or beverages made with the highly unsaturated, tallow flavored fats instead of triglyceride fats contain less cholesterol and less saturated fats. Ingestion of these foods can lead to reduced serum cholesterol and thus reduced risk of heart disease.

G. ANALYTICAL METHODS

1. Carbon Number Profile (CNP)

The carbon number profile (CNP) of the triglycerides can be determined by programmed temperature-gas chromatography (GC) using a short fused silica column coated with methyl silicone for analysis and characterization of the composition by molecular weight. The glycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue.

Preparation of the fat sample for analysis is as follows: The fat sample is heated at 80° C. until completely melted. A 500 microl. portion of the melted sample is pipetted into a 5 ml. volumetric flask, and is then diluted to volume using chloroform. A 250 microl. portion of the solution in the flask is transferred to an autosampler vial and then 1.0 ml. of bis (trimethylsilyltrifluoroacetamide) (BSTFA) is pipetted into the vial which is then capped. The contents in the vial are heated for 15 minutes at 70° C. and then cooled before analysis.

For determining the CNP-GC of the prepared fat samples, a Hewlett-Packard 5890 series gas chromatograph equipped with temperature programming and a hydrogen flame ionization detector is used together with a Hewlett-Packard 3351B data system. A 2 m. long, 0.25 mm. diameter fused silica capillary column coated with a thin layer of methyl silicone (J&W DB-1) is also used. A glass insert packed with silated glass wool (HP 18740-80190) and a high temperature graphite O-ring is used with this column. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the data system and recorder. The recorder prints out the gas chromatograph curve and the data system electronically integrates the area under the curve. The following instrument conditions are used with the gas chromatograph:

| | |
|---|---|
| Septum purge | 2-3 ml./min. |
| Split ratio | 85/1-100/1 |
| Hydrogen carrier gas | 2-4 ml./min. |
| Hydrogen pressure | 40 psi |
| Detector temp. | 375° C. |
| Detector hydrogen | 30 ml./min |
| Detector air | 330 ml./min. |
| Detector make-up | 25 ml./min. |

1.0 microl. of the prepared fat sample is injected by a gas-tight syringe, or a HP 7673A microdrop injector with tray thermostated to 25° C., into the sample port of the chromatograph. The components in the sample port are warmed up to a temperature of 340° C. and swept by a hydrogen carrier gas to push the components into the column. The column temperature is initially set at 80° C. and held at this temperature for 0.5 min. The column is then heated up to a final temperature of 340° C. at a rate of 15° C./min. The column is maintained at the final temperature of 340° C. for an additional 25 minutes.

The chromatographic peaks generated are then identified and the peak areas measured. Peak identification is accomplished by comparison to known pure glycerides previously programmed into the data system. The peak area as determined by the data system is used to calculate the percentage of glycerides having a particular Carbon Number (CN) according to the following equation:

$$\% \, C_N = (\text{Area of } C_N/S) \times 100$$

wherein S = sum of Area of $C_N$ for all peaks generated.

The Area of $C_N$ is based upon the actual response generated by the chromatograph multiplied by a response factor for glycerides of the particular Carbon Number. These response factors are determined by comparing the actual responses of a mixture of pure fatty acids and glycerides of various Carbon Numbers to the known amounts of each fatty acid or glyceride in the mixture. A fatty acid/glyceride generating an actual response greater than its actual amount has a response factor less than 1.0; likewise, a fatty acid/glyceride generating a response less than that of its actual amount has a response factor of greater than 1.0. (Typical response factors for the triglycerides of interest are 0.95 to 1.0.) A typical standard mixture of fatty acids and glycerides used (in a chloroform solution) is as follows:

| Component | Carbon No. | Amount (mg./ml.) |
|---|---|---|
| Octanoic | 8 | 0.5 |
| Decanoic | 10 | 0.5 |
| Palmitic acid | 16 | 0.5 |
| Monopalmitin | 16 | 0.5 |
| Behenic acid | 22 | 0.5 |
| Monostearin | 18 | 0.5 |
| Dipalmitin | 32 | 0.5 |
| Palmitostearin | 34 | 0.5 |
| Distearin | 36 | 0.5 |
| Tripalmitin | 48 | 1.5 |
| Dipalmitostearin | 50 | 1.5 |
| Distearopalmitin | 52 | 1.5 |
| Tristearin | 54 | 1.5 |
| Tribehenin | 66 | 1.5 |

The following is a typical carbon number profile of a representative oil of this invention:

| Component | Percent |
|---|---|
| C16 Acid | .5 |
| C34 Diglyceride | .2 |
| C35 Diglyceride | .7 |
| C46 Triglyceride | .2 |
| C48 Triglyceride | 2.2 |
| C50 Triglyceride | 9.7 |
| C52 Triglyceride | 21.1 |
| C54 Triglyceride | 54.4 |
| C56 Triglyceride | 1.9 |
| C58 Triglyceride | .2 |
| C62 Triglyceride | .1 |
| Other than listed above: | 8.6 |

2. Fatty Acid Composition
General Procedure

Fatty acid methyl esters (FAME) are prepared from the fat and then are separated on a capillary column which is coated with DB-WAX stationary phase. The FAME are separated by chain length and degree of unsaturation. A split injection is made with flame ionization detection. Quantitation is performed by an area normalization method.

| Equipment | |
|---|---|
| Gas Chromatograph | Hewlett-packard 5890, or equivalent, equipped with a split injector and flame ionization detector |
| Autosampler Injector | Hewlett-packard 7673A, or equivalent |
| Column | 15 m × 0.25 mm I.D., fused silica capillary column coated with DB-WAX (0.25 micron film thickness) J&W Sci. |
| Data System | Hewlett-packard 3350 |
| Recorder | Kipp & Zonen, BD40 |
| Reagents | |
| Hexane | Burdick & Jackson, or equivalent |
| FAME Reference Mixtures 15A & 17A | Nu Chek Prep (Elysian, MN) |

EQUIPMENT OPERATION

A reference mixture of FAME from Nu Chek Prep is used to check the operation of the instrument. Either standard 17A of 15A can be used. The reference mixture of FAME should be diluted with hexane and then injected into the instrument. A new vial of 17A or 15A should be opened every other day since the highly unsaturated components C18-2 and C18-3, oxidize easily. The results from the reference standards should be compared with the known values provided by Nu Chek and a judgment made concerning correct operation of the gas chromatograph system.

OPERATION

A. Instrumental Set-Up

1. Install the column in the gas chromatograph, and set up the instrumental conditions as outlined in part B.
2. Set up the data system with the peak area normalization method to acquire and analyze the data. Consult the data system reference manual on how to do this—HP3350 User's Reference Manual. Unity response factors are used for each component.

B. Instrumental Conditions

| Instrument | Hewlett-Packard 5890 |
|---|---|
| Column | 15 m × 0.25 mm I.D., coated with DB-WAX, 0.25 u film thickness |
| Column Head Pressure | 12.5 psi |
| Carrier Gas | Helium |
| Injector "A" Temperature | 210° C. |
| Split Vent Flow | 100 mL/min. |
| Septum Purge | 1.5 mL/min. |
| Oven Temp Profile | |
| Initial Temperature | 110° C. |
| Initial Time | 1 min. |
| Rate 1 | 15° C./min. |
| Final Temp 1 | 170° C. |
| Final Time 1 | 0 min. |
| Rate 2 | 6° C./min. |
| Final Temp 2 | 200° C. |
| Final Time 2 | 0 min. |
| Rate 3 | 10° C. |
| Final Temp 3 | 220° C. |
| Final Time 3 | 8 min. |
| Detector | FID |
| Detector Temp | 230° C. |
| Make-Up Gas | 30 mL/min. |
| Detector $H_2$ Flow | 30 mL/min. |
| Detector Air Flow | 300 mL/min. |

SAMPLE ANALYSIS

1. Dilute the reference mixture of FAME (17A or 15A) with hexane. The methyl esters should be approximately 2% in hexane. Inject 1 μL of this solution. Inspect the data to insure the correct analysis is obtained for the reference sample.

2. Prepare the methyl ester of the fat sample for gas chromatograph analysis as described below.

3. Inject 1.0 ml of the sample into the gas chromatograph and initiate the temperature program to analyze the sample.

PREPARATION OF METHYL ESTERS FOR GAS CHROMATOGRAPH ANALYSIS

The gas chromatographic analysis of the fatty acid composition of fats and oils is most easily accomplished if the fatty acids of the fat are converted to methyl esters for analysis. Although refluxing with sulfuric acid/methanol will convert almost any fatty material to its methyl esters, the procedure is cumbersome and time consuming. The sodium methoxide method outlined below will perform the same job for most samples and is rapid and simple to use. The sodium methoxide procedure for glycerides and other esters uses the trans esterification procedure to redistribute the fatty acids groups in relation to the concentration of the alcohols present. This procedure will methylate esterified fatty acids of nearly any type provided the ester will melt at the boiling point of methanol (80° C.).

EQUIPMENT

| Magnetic Stirring Hot Plate | |
|---|---|
| Small Stirring Bars | |
| Separatory Funnels | Pear-shaped, 250 mL, Kimax #2903-F |
| Beakers | 150 and 3000 mL capacity |
| Vials | 1 mL, Hewlett-Packard #5080-8712, or equivalent |
| Disc (Septa) | 11 mm diam., Hewlett-Packard #5080-8713, or equivalent |
| Syringe | 10.0 uL, Hamilton #701N, or equivalent |
| Hand Crimper | For use of 1 mL vial, Supelco, Inc., #03-3195 |
| Soxhlet Flask | 250 mL |
| Condenser | Water-cooled |
| Dispensing Flasks | 25 and 50 mL |
| Reagents | |
| Sodium Methoxide | Add approximately 9 g of metallic sodium to a fresh 3 liter bottle of reagent grade methanol. This must be done in a hood since hydrogen gas is evolved. |
| Hexane | Technical grade |
| ½% HCl | Pour slowly 12.5 mL concentrated HCl into a 3 liter beaker half-filled with distilled water. Then bring to volume of 2.5 liters. Transfer to marked storage bottle. |
| Saturated Salt HCl Solution | Dissolve 2 (1#) jars of NaCl to 2.5 liters of ½% HCl. |
| Sodium Sulfate ($Na_2SO_4$) | Certified ACS Anhydrous |

DERIVATIZATION PROCEDURE

1. Place 10-15 g of fat into a 150 mL beaker.

2. Using a dispensing flask, add 50 mL of sodium methoxide reagent.

3. Drop in a stirring bar, cover beaker with a watch glass and place on a stirring hot plate using low heat. (After 3-5 minutes of boiling the mixture will clear up indicating methylation has taken place.)

4. Add (using a dispensing flask) 25 mL of saturated salt/HCl solution while the mixture is still stirring.

5. Remove from heat and mix with 50 mL of n-hexane.

6. After separation, pour a portion of the hexane layer through filter paper containing approximately 5 g of anhydrous sodium sulfate.

7. Collect the filtrate and evaporate the n-hexane with dry nitrogen to leave the pure methyl esters.

8. Using a disposable pipet, or other transfer technique, place approximately 0.5 mL of methyl esters into a 1 mL septa vial and fasten with crimper. This sample is now ready for gas chromatograph analysis.

3. Thin Layer Chromatography (TLC)
 a. Reagents and Materials
  Iodine (Aldrich)
  Ethyl Ether (reagent grade)
  Glacial Acetic Acid (reagent grade)
  Methanol (reagent grade)
  Chloroform (reagent grade)
  HPTLC-GHLF 57527 Analtech TLC Plates (High Performance Thin-Layer Chromatography Plates)
  Hard-layer silica coating/absorbents that fluoresce
 b. Procedure Dissolve 5 drops of reaction mixture in 1 ml CHCl₃. Use micropipet to spot 1-2 ml of solution on plate, 1.5 cm from base of plate. Wait for spot to dry and develop plate in suitable TLC chamber with petroleum ether-/ethyl ether/glacial acetic acid (90/10/10, v/v/v). Use filter paper in TLC chamber to increase solvent vapor phase. Remove plate from chamber and dry. Place plate in an iodine chamber for developing.

From the origin the order of component elution is monoglyceride/glycerine, 1,2- and 2,3-diglycerides, fatty acids, triglycerides, and unsaponifiable materials, e.g., soaps, etc.

c. Notes on Procedure

Plate development takes 2-5 minutes. Keep solvent level in chamber below spot origin on plates.

Allow solvent front to develop to 1 cm from top of plate.

Keep TLC chamber closed or solvent system composition will change.

Mark origin and final solvent front point to calculate Rf values.

Development solution should be made fresh every week.

To help identify spots, run standards of known compounds to establish Rf values of the following compounds:

monoglyceride standard: monoolein
fatty acid standard: oleic acid or stearic acid or palmitic acid
diglyceride standard: dioleyl diglyceride
triglyceride standard: any medium or long chain saturated fatty acid triglyceride The procedure has a sensitivity of less than 0.4 wt. % relative to diglycerides spiked into the triglyceride/fatty acid matrix.

EXAMPLE I

| Ingredient | Amount (pounds) |
|---|---|
| Oleic Acid fraction | 140 |
| Glycerine | 14 |

Oleic acid fraction of tallow (obtained from the hydrolysis of tallow, and available from Quantum Chemical) is placed in a 150 pound deodorizer/reactor. The oleic acid contains 17% minor fatty acids. Food grade glycerine (available from Procter & Gamble Company) is added to the reactor flask. This mixture is heated to 190° C. with a vigorous nitrogen sparge. The reactor is fitted with an exhaust outlet to remove the water with the nitrogen during the sparging.

The reaction is followed by thin layer chromotography and judged complete when the reaction shows triglycerides with no or very few diglycerides. The excess oleic acid is removed by vacuum distillation at 180° C. and 1 mm Hg.

The resultant triglyceride mixture is steam stripped at 260° C. at 1 mm Hg for 3 hours. The level of free acid is <0.05%.

About 120 lbs. of frying oil is produced. When french fries are fried in this oil, they have a tallow flavor.

The fatty acid composition is:

| Fatty Acid Composition | |
|---|---|
| C12:0 | — |
| C14:0 | 1.6% |
| C16:0 | 3.9% |
| C18:0 | 1.0% |
| C18:1 | 71.4% |
| C18:2 | 5.8% |
| C18:3 | 0.2% |
| C20:0 | 0.3% |
| Others | 15.8% |
| Total Saturates | 6.8% |

The melting point is estimated to be about −6° C.

Gas chromatographic analysis for cholesterol indicated a level of less than 1 mg per 100 g of oil.

EXAMPLE II

The process used is the same as in Example I for making the tallow oil except that lard is hydrolyzed to free fatty acids instead of tallow. The acids are solvent crystallized and separated to an olein and stearin fraction. The olein is then reesterified with glycerol to yield the final oil. The oil has 14-15% saturates due to the saturates in the oleic acid fraction.

Sensory evaluations by an expert flavor panel found the lard fat to have the characteristic lard flavor notes. This lard fat derives its flavor impact mainly from the minor fatty acids present in the oleic acid fraction.

What is claimed is:

1. A process for making a frying oil comprising:
   a) fractionating fatty acids from animal fats to make an unsaturated fraction and a saturated fraction; wherein said unsaturated fraction comprises from 50% to 85% oleic acid, less than 15% saturated fatty acids, from 5% to 25% minor fatty acids and less than 10 mg/100 gm of cholesterol;
   b) esterifying glycerine with said unsaturated fraction at a temperature of from about 100° C. to 250° C. while concurrently removing water from the reaction, the ratio of unsaturated fatty acid to glycerine being from 3:1 to 8:1; and
   c) deodorizing the resultant low saturated triglyceride by steam stripping at temperatures of from about 220° C. to about 270° C. under vacuum.

2. A process according to claim 1 wherein said minor fatty acids comprise unsaturated fatty acids having from 12 to 24 carbon atoms, methyl-branched chain fatty acids having from 12 to 24 carbon atoms, hydroxy fatty acids, odd chain saturated fatty acids having from 12 to 24 carbon atoms, and polyunsaturated fatty acids.

3. A process according to claim 2 wherein said polyunsaturated fatty acids are selected from the group consisting of linoleic, linolenic and arachadonic acids and mixtures thereof.

4. A process according to claim 1 wherein said fractionation is by crystallization and distillation.

5. A process according to claim 1 wherein the esterification of glycerine is done at temperatures of from 175° C. to 200° C. under an inert atmosphere.

6. A process according to claim 5 wherein the esterification is solvent-free and under a nitrogen atmosphere.

7. A process according to claim 6 wherein the water is removed by vacuum stripping of the reaction mixture at pressures of from 50 to 300 mm Hg.

8. A process according to claim 6 wherein the water is removed by adsorbtion by hydrophilic materials.

9. A process according to claim 8 wherein said hydrophilic material is selected from the group of zeolite molecular seives, activated carbons and activated alumina.

10. A triglyceride derived from animal fats which imparts meaty flavor to fried foods consisting of:
   (1) less than 0.05% free fatty acids;
   (2) less than 5 mg per 100 grams cholesterol;
   (3) 0%–4% diglyceride;
   (4) 0 to 0.5% C46 triglyceride;
   (5) 1.5%–2.5% C48 triglyceride;
   (6) 8–12% C50 triglyceride;
   (7) 15–25% C52 triglyceride;
   (8) 45–70% C54 triglyceride;
   (9) 1–2.5% C56 triglyceride;
   (10) 0.1–0.3% C58 triglyceride; and
   (11) 0–2% C62 triglyceride.

11. A composition for imparting meat flavor to fired foods consisting of a triglyceride prepared by esterifying glycerine with fatty acid mixture of 5% to 80% oleic acid, 15% or less saturated fatty, the balance comprising a mixture of fatty acids derived from animal fats comprising a mixture of dodecanoic acid, tetradecanoic acid tetradecenoic acid, 12-methyltetradecanoic acid, 13-methyltetradecanoic acid, pentadecanoic acid, 14-methylpentadecanoic acid, hexadecanoic acid, hexadecenoic acid, heptadecanoic acid, heptadecenoic acid, octadecanoic acid, octadecenoic acid, octadecadienoic acid, and octadecatrienoic acid.

12. A low calorie frying oil which imparts a meaty flavor to fried foods comprising:
   (1) from about 10% to about 65% of an edible, substantially nonabsorbable, substantially nondigestible polyol fatty acid polyester having at least 4 fatty acid ester groups, wherein the polyol is selected from sugars and sugar alcohols containing from 4 to 8 hydroxy groups and wherein each fatty acid group has from 2 to 24 carbon atoms; and
   (2) from about 35 to about 90% highly unsaturated, tallow flavored triglycerides according to claim 10.

13. A reduced calorie oil comprising:
   (1) from about 10% to about 65% of a reduced calorie fat selected from MMM, MLM, MML, LLM, LML and LLL triglycerides, and mixtures thereof; wherein M is a saturated fatty acid residue selected from $C_6$ to $C_{10}$ saturated fatty acids, and mixtures thereof; wherein L is a saturated fatty acid residue selected from $C_{18}$ to $C_{24}$ saturated fatty acids, and mixtures thereof; and
   (2) from about 35% to about 90% of the frying oil of claim 10.

14. A reduced calorie oil according to claim 13 wherein said reduced calorie fat is at least about 85% of said composition and wherein said reduced caloried fat is:
   (1) a mixture of MLM, MML, LLM and LML and up to about 15% combined MMM and LLL triglycerides, and
   (2) the fatty acid composition comprises from about 30% to about 90% $C_{18}$ to $C_{24}$ saturated fatty acids.

* * * * *